US012738025B2

(12) United States Patent
Chang et al.

(10) Patent No.: US 12,738,025 B2
(45) Date of Patent: Sep. 15, 2026

(54) APPARATUS FOR DOMAIN GENERALIZATION OF MACHINE LEARNING MODELS, METHODS AND COMPUTER READABLE RECORDING MEDIUMS THEREFOR

(71) Applicant: Hyperconnect LLC, Seoul (KR)

(72) Inventors: Bu Ru Chang, Seoul (KR); Byoung Gyu Lew, Seoul (KR); Dong Hyun Son, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 395 days.

(21) Appl. No.: 18/466,617

(22) Filed: Sep. 13, 2023

(65) Prior Publication Data

US 2024/0087294 A1 Mar. 14, 2024

(30) Foreign Application Priority Data

Sep. 13, 2022 (KR) ........................ 10-2022-0115062
May 3, 2023 (KR) ........................ 10-2023-0057729

(51) Int. Cl.
*G06V 10/77* (2022.01)
*G06V 10/75* (2022.01)

(52) U.S. Cl.
CPC ........ *G06V 10/7715* (2022.01); *G06V 10/751* (2022.01)

(58) Field of Classification Search
CPC .... G06V 10/761; G06V 20/70; G06V 10/764; G06V 10/431; G06V 10/473; G06V 10/82; G06V 10/7715; G06V 10/751; G06V 10/30; G06V 10/40; G06V 10/774; G06V 10/7747; G06V 10/776; G06V 10/811; G06V 10/454; G06V 10/54; G06V 10/7764; G06V 10/84; G06V 20/41; G06V 30/18057; G06V 20/698; G06V 30/19173; G06V 30/194; G06T 2211/441; G06T 3/4046; G06T 5/60; G06T 9/002; G06T 2207/20076; G06T 2207/20081; G06T 2207/20084; G06N 3/02;

(Continued)

(56) References Cited

U.S. PATENT DOCUMENTS 12,541,570 B2 * 2/2026 Marrero .............. G06F 18/2148
2020/0293828 A1 * 9/2020 Wang ..................... G06N 20/00

(Continued)

FOREIGN PATENT DOCUMENTS

CN 116342938 A * 6/2023 ........... G06V 10/765
CN 116524249 A * 8/2023 ........... G06V 10/765
CN 116524538 A * 8/2023 ........... G06V 40/103

*Primary Examiner* — Jose L Couso
(74) *Attorney, Agent, or Firm* — Patent Capital Group

(57) ABSTRACT

Systems and methods for domain generalization configured in accordance with some embodiments of the invention are illustrated. One embodiment includes a method for domain generalization of a machine learning model. The method sets a parameter of a first model and a parameter of a second model based on a pre-trained model. The method learns the second model by performing a predetermined task on a source domain. The method estimates an unobservable gradient for model updates on an unseen domain based on: the parameter of the first model, and the parameter of the second model. The method updates the first model based on the estimated unobservable gradient.

19 Claims, 7 Drawing Sheets

(58) Field of Classification Search
CPC ........... G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/213; G06F 18/214; G06F 18/22; G06F 18/241; G06F 18/24; G06F 18/2411; G06F 18/2415; G06F 18/253; G06F 30/27; Y10S 128/925
See application file for complete search history.

(56) References Cited

U.S. PATENT DOCUMENTS

| | | | | |
|---|---|---|---|---|
| 2021/0390355 | A1* | 12/2021 | Xu | G06F 18/2411 |
| 2022/0180195 | A1* | 6/2022 | Sawada | G06N 3/045 |
| 2022/0247146 | A1* | 8/2022 | Han | G06V 10/14 |
| 2023/0062289 | A1* | 3/2023 | Amma | G06V 10/82 |
| 2023/0081913 | A1* | 3/2023 | Tsai | G06V 10/811 382/159 |
| 2023/0122207 | A1* | 4/2023 | Segù | G06N 3/08 706/21 |
| 2023/0306721 | A1* | 9/2023 | Karlinsky | G06V 10/82 |
| 2023/0368078 | A1* | 11/2023 | Arpit | G06F 18/285 |
| 2024/0153258 | A1* | 5/2024 | Mangla | G06V 10/764 |
| 2024/0203098 | A1* | 6/2024 | Sultana | G06V 10/7715 |
| 2024/0312197 | A1* | 9/2024 | Chiu | G06V 10/7753 |
| 2024/0371015 | A1* | 11/2024 | Ansari | G06N 3/0895 |

* cited by examiner

Parameter space $g$ : Biased gradient
$g_u$ : Unobservable gradient
$\theta$ : Parameter of model Source domain
Unseen domain Parameter space $g^f$ $\theta$ $\tilde{g}_u$ $g^f$ : Gradient of second model $\tilde{g}_u$ : Estimated unobservable gradient $\theta$ : Parameter of model Source domain Unseen domain

FIG. 6

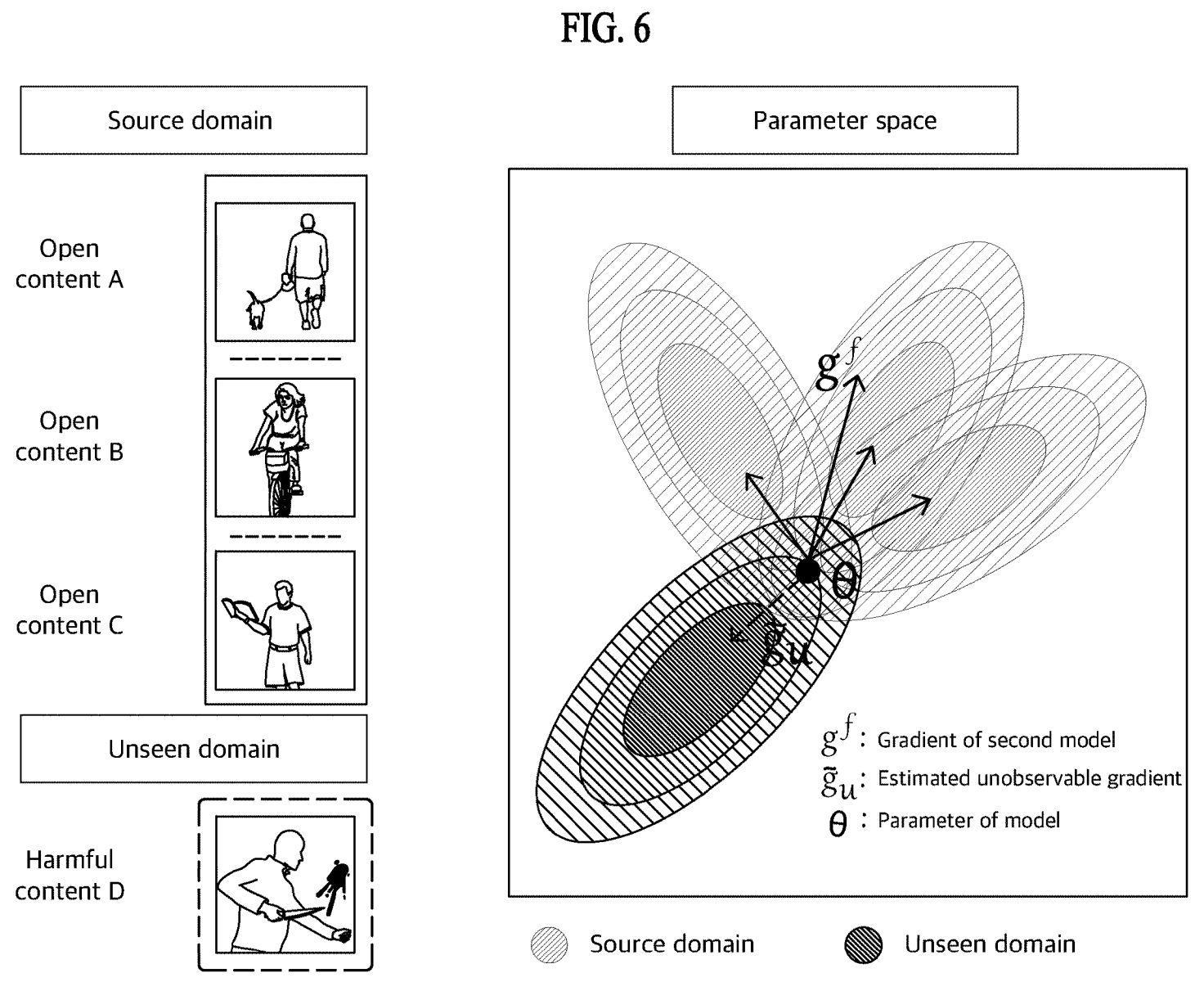

Source domain

Open content A

Open content B

Open content C

Unseen domain

Harmful content D

Parameter space $g^f$ $\theta$ $\tilde{g}^u$ $g^f$ : Gradient of second model $\tilde{g}^u$ : Estimated unobservable gradient $\theta$ : Parameter of model Source domain Unseen domain

FIG. 7

APPARATUS FOR DOMAIN GENERALIZATION OF MACHINE LEARNING MODELS, METHODS AND COMPUTER READABLE RECORDING MEDIUMS THEREFOR

CROSS-REFERENCE TO RELATED APPLICATIONS

The current application claims the benefit of and priority to Korean Patent Application No. 10-2022-0115062 filed on Sep. 13, 2022, and Korean Patent Application No. 10-2023-0057729, filed on May 3, 2023, in the Korean Intellectual Property Office, the disclosures of which are incorporated herein their entireties by reference.

FIELD OF THE INVENTION

The present invention generally relates to apparatus for domain generalization performance and, more specifically, apparatus for domain generalization performance of machine learning models for application to various services.

BACKGROUND

In learning a machine learning model, learning data and test data are usually treated as being independent and identically distributed. However, since this is not always possible in real life, existing machine learning models often show poor performance on unseen domains. The goal of "domain generalization" systems is to build a model so that a target task is well performed on unseen domains even when only source domains are used for model optimization.

SUMMARY OF THE INVENTION

Systems and methods for domain generalization configured in accordance with some embodiments of the invention are illustrated. One embodiment includes a method for domain generalization of a machine learning model. The method sets a parameter of a first model and a parameter of a second model based on a pre-trained model. The method learns the second model by performing a predetermined task on a source domain. The method estimates an unobservable gradient for model updates on an unseen domain based on: the parameter of the first model, and the parameter of the second model. The method updates the first model based on the estimated unobservable gradient.

In a further embodiment, both the first model and the second model include: a feature extractor, and a task execution module. Setting parameters of a model includes setting parameters of a feature extractor of the model to at least one parameter of the pre-trained model. The task execution module of the first model and the task execution module of the second model each have parameters that are arbitrarily set.

In another embodiment, learning the second model includes retrieving at least one result value, wherein: the at least one result value is output by the second model after receiving at least one data sample included in the source domain, and each result value of the at least one result value corresponds to a data sample of the at least one data sample. Learning the second model further includes each result value of the at least one result value, modifying a total loss by comparing the result value to a label for the corresponding data sample. Learning the second model further includes updating a gradient and the parameter of the second model in a direction associated with a decrease in the total modified loss.

In a still further embodiment, modifying the total loss includes calculating a cross-entropy loss value of the second model by using each data sample included in a mini-batch selected from the source domain.

In another embodiment, wherein estimating the unobservable gradient includes estimating a vector by subtracting, for parameters of corresponding types, the parameter of the second model from the parameter of the first model.

In yet another embodiment, updating the first model includes determining a gradient of the second model based on the estimated unobservable gradient. Updating the first model further includes updating the parameter of the second model based on the updated gradient of the second model. Updating the first model further includes updating the parameter of the first model based on the updated parameter of the second model.

In a still further embodiment: the second model includes a feature extractor. Determining the gradient of the second model includes: calculating a unit vector of a part from the estimated unobservable gradient, wherein the part corresponds to the feature extractor of the second model. Determining the gradient of the second model further includes applying a predetermined gradient scale factor to the unit vector. Determining the gradient of the second model further includes reflecting the unit vector at a gradient of the feature extractor of the second model.

In a further embodiment, reflecting the unit vector is based, at least in part on the equation:

$$g^f = \frac{1}{2}\left(g^f + \lambda\|g^f\|_2 \cdot \frac{\tilde{g}_u^f}{\|\tilde{g}_u^f\|_2}\right) \cdot g^f$$

represents the gradient of the feature extractor of the second model.

$$\tilde{g}_u^f$$

represents an estimated unobservable gradient of a part corresponding to the feature extractor of the second model. $\lambda$ represents the predetermined gradient scale factor. The predetermined gradient scale factor is greater than 0 and not more than 0.5.

In another embodiment, updating the parameter of the first model includes updating an exponential moving average as a new parameter of the first model, wherein the exponential moving average is between the parameter of the first model and the updated parameter of the second model.

In a further embodiment, updating the parameter of the first model is based, at least in part, on the equation: $\theta_{GE}=m\theta_{GE}+(1-m)\theta_{TE}$. $\theta_{GE}$ represents the parameter of the first model. $\theta_{TE}$ represents the parameter of the second model. m represents a moving average coefficient. The moving average coefficient is not less than 0.9 and not more than 1.0.

In another embodiment, the method further includes applying the updated first model to a task on the unseen domain.

In yet another embodiment, the source domain includes a plurality of labeled image data. The unseen domain includes a plurality of labeled video data. The predetermined task is a classification task through a machine learning model.

In still another embodiment, the source domain includes content data. Access of the content data is not restricted. The unseen domain includes harmful content data corresponding to a predetermined harmfulness criterion.

One embodiment includes a method for domain generalization of a machine learning model. The method retrieves a first model and a second model. The method learns the second model by classifying data of a first domain related to a first service. The method estimates an unobservable gradient based on: a parameter of the first model, and a parameter of the second model. The method updates the first model based on the estimated unobservable gradient. The method classifies data of a second domain related to a second service by using the updated first model.

One embodiment includes a non-transitory computer-readable recording medium including instructions, that when executed by a processor, perform a process for domain generalization of a machine learning model. The process sets a parameter of a first model and a parameter of a second model based on a pre-trained model. The process learns the second model by performing a predetermined task on a source domain. The process estimates an unobservable gradient for model updates on an unseen domain based on: the parameter of the first model, and the parameter of the second model. The process updates the first model based on the estimated unobservable gradient.

One embodiment includes an apparatus for domain generalization of a machine learning model. The apparatus includes a processor; memory accessible by the processor; and instructions stored in the memory that direct the processor. The processor sets a parameter of a first model and a parameter of a second model based on a pre-trained model. The processor learns the second model by performing a predetermined task on a source domain. The processor estimates an unobservable gradient for model updates on an unseen domain based on the parameter of the first model and the parameter of the second model. The processor updates the first model based on the estimated unobservable gradient.

One embodiment includes an apparatus for domain generalization using a first model and a second model based on a pre-trained model. The apparatus includes a processor; memory accessible by the processor; and instructions stored in the memory that direct the processor. The processor retrieves a first model and a second model. The processor learns the second model by classifying data of a first domain related to a first service. The processor estimates an unobservable gradient based on a parameter of the first model and a parameter of the second model. The processor updates the first model based on the estimated unobservable gradient. The processor classifies data of a second domain related to a second service by using the updated first model.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 5-6 illustrate examples of domain generalization performed in accordance with numerous embodiments of the invention.

FIG. 7 illustrates an apparatus, configured in accordance with various embodiments of the invention, for domain generalization of a machine learning model.

DETAILED DESCRIPTION

Figure 1:
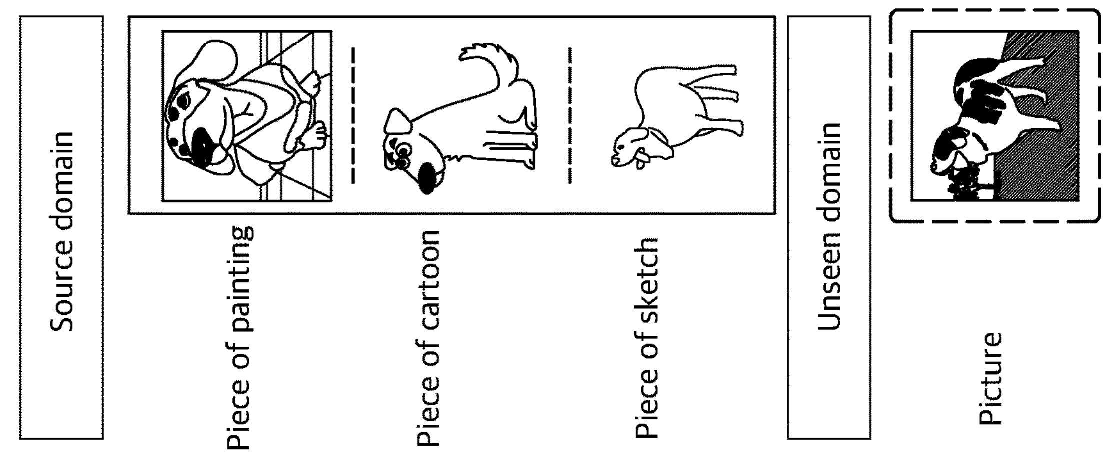
FIG. 1 illustrates gradients, determined in accordance with certain embodiments of the invention, that correspond to changes in model parameters according to learning on source and unseen domains.

Turning now to the drawings, systems and methods for domain generalization of various machine learning models (also referred to as "models" in this disclosure) are illustrated. Hereinafter, specific example embodiments are described with reference to the drawings. The following detailed description is provided for a comprehensive understanding of the methods, apparatus, and/or systems described herein. However, the example embodiments are only for understanding and the present disclosure is not limited to the detailed description.

Systems and methods configured in accordance with numerous embodiments of the invention may allow for the estimation of unobservable gradients that reduce potential risks in unseen domains, using largescale pre-trained models. Previous studies have obtained useful results in the field of domain generalization by using the generalization power of pre-trained models. Generalization power may refer to the capacity for given models to adapt properly to new, previously unseen data. Domain generalization aims to incorporate knowledge from multiple source domains into a single model that could generalize well on unseen target domains. In the aforementioned studies, the models used were frozen to preserve the generalization power of the models, so the models could not learn task-specific knowledge during the model optimization process. Systems and methods configured in accordance with multiple embodiments of the invention may perform target-specific tasks (e.g., classification, identification) accurately on unseen domains (e.g., painted images) even in instances when only source domains (e.g., photographic images) were used for the initial model optimization.

Systems and methods configured in accordance with a number of embodiments of the invention may facilitate the generalization capacity of such models by minimizing bias. Even when a parameter of one of the models is fine-tuned through model optimization on a source domain, the problem remains that the gradient representing the learning direction of the model is biased toward the source domain, damaging the model's generalization power. In contrast, methods in accordance with many embodiments of the invention may involve, but are not limited to, preventing model gradients from bias in source domains. Additionally or alternatively, methods in accordance with various embodiments of the invention may be directed toward learning task-specific knowledge from source domains. While the task-specific knowledge is learned, models may be configured to preserve the generalization power of pre-trained models.

As such, systems and methods configured in accordance with numerous embodiments of the invention may operate under the assumption that pre-trained models are a loose approximation of oracle models generalizing on unseen domains. In accordance with numerous embodiments of the invention, oracle models may represent optimized models, in which the distribution of data on the unseen domain(s) is sufficiently reflected in gradients and/or parameters of the models. Systems and methods configured in accordance with multiple embodiments of the invention may approach the accuracy of the oracle model by learning task-specific knowledge. Methods performed in accordance with many embodiments of the invention may be referred to as the "Gradient Estimation for Unseen Domain Risk Minimization with Pre-Trained Models" process (also referred to GESTUR in this application), as referenced in "Gradient Estimation for Unseen Domain Risk Minimization with Pre-Trained Models." Byunggyu Lew, Donghyun Son, and Buru Chang. *arXiv preprint arXiv:*2302.01497 (2023), the entire disclosure of which, including the disclosure related to estimated unobserved gradients, incorporated by reference in its entirety.

In describing many embodiments of the invention, when it is determined that a detailed description of the related known technology may unnecessarily obscure the gist of the disclosed embodiments, the detailed description will be omitted. In addition, the terms to be described later are terms defined in consideration of functions in numerous embodiments of the present disclosure, which may vary according to the intentions or customs of users and/or operators. Therefore, definitions should be made based on the content throughout the present disclosure. The terms used in the detailed description are for the purpose of describing the embodiments only, and the terms should never be restrictive. Unless explicitly used otherwise, expressions in the singular include the meaning of the plural. In the present disclosure, expressions including but not limited to "include" and/or "comprise" are intended to refer to certain features, numbers, steps, acts, elements, or a combination thereof, and the expressions should not be construed to exclude the presence or possibility of one or more other features, numbers, steps, acts, elements, or combinations thereof other than those described.

Terms used to illustrate many embodiments of the invention are selected as much as possible from general terms that are widely used at present while taking into consideration the functions obtained in accordance with numerous embodiments of the invention. However, the terms may vary depending on the intention or precedent of a person skilled in the art, the emergence of new technology, and the like. In accordance with some embodiments, terms used herein may be replaceable by other terms based on the intentions of those skilled in the art, customs, emergence of new technologies, etc.

Additionally or alternatively, in particular cases, terms that are not popularly applied may be used in the detailed description. Accordingly, it should be noted that the terms used herein should be construed based on practical meanings thereof and the whole content of this specification, rather than being simply construed based on the names of the terms. The terms " . . . unit," " . . . group," and/or " . . . module," for example, may refer to components that exert at least one function and/or operation, and may be realized in hardware and/or software. The expression "at least one of a, b and c" described throughout the specification may include "a alone," "b alone," "c alone," "a and b," "a and c," "b and c" or "all of a, b and c." In the following description, the terms "transmission," "communication," "sending," "receiving" and other similar terms not only refer to the direct transmission of signals and/or information from one component to another component, but may also include transmission via another component. In particular, to "transmit" and/or "send" signals and/or information to elements may indicate the final destinations of the signals and/or information. Additionally or alternatively, the use of these terms may not imply direction destinations. The same is applied to "receiving" signals and/or information. Additionally or alternatively, in the present disclosure, when two or more pieces and/or data or information are "related," it indicates that when one piece of data (and/or information) is obtained, at least a part of the other data (and/or information) may be obtained based thereon.

Further, terms such as first and second may be used to describe various components, but the above components should be not limited by the above terms. The above terms may be used for the purpose of distinguishing one component from another component. For example, without departing from the scope of the present disclosure, a first component may be referred to as a second component. Additionally or alternatively, the second component may also be referred to as the first component.

In describing the system and methods in accordance with various embodiments of the invention, phrasing may be intended to maximize clarity. For example, descriptions of technical contents that are well-known in the technical field to which the present disclosure pertains and that are not directly related to the present disclosure may be omitted. This may be done to more clearly convey the gist of the present disclosure without obstruction. For the same reason, some elements may be exaggerated, omitted, and/or schematically illustrated in the accompanying drawings. Additionally or alternatively, the size of each element may not fully reflect the actual size. In each figure, the same or corresponding elements are assigned the same reference numerals. Similar reference numerals can refer to similar elements throughout.

Advantages and/or features of the present disclosure, as well as methods of achieving such advantages and/or features, can become apparent with references to the several embodiments described below in detail together with the accompanying drawings. However, the present disclosure is not limited to the example embodiments disclosed below, and may be implemented in various different forms. The example embodiments are provided only so as to render the intended breadth of the present disclosure and inform the scope of the present disclosure to those of ordinary skill in the art to which the present disclosure pertains. The present disclosure is only defined by the scope of the claims.

In accordance with numerous embodiments of the invention blocks of flowchart diagrams and/or combinations of flowchart diagrams may be performed by computer program instructions. The computer program instructions may be embodied in one or more processors of general-purpose and/or special-purpose computers. Additionally or alternatively, computer program instructions may be embodied in one or more processors of other programmable data processing equipment. Thus, the instructions, executed via processors of computer and/or other programmable data processing equipment, may generate part(s) for performing functions described in the flowchart blocks.

To implement a function in a particular manner, computer program instructions may, additionally or alternatively, be stored in computer-usable and/or computer-readable memory that may direct computers and/or other programmable data processing equipment. Thus, the instructions stored in the computer-usable or computer-readable memory may be produced as articles of manufacture containing instruction parts for performing the functions described in the flowchart blocks.

Additionally or alternatively, computer program instructions may be embodied in computers and/or other programmable data processing equipment. Thus, series of operations may be performed in computers and/or other programmable data processing equipment to create computer-executed processes, Additionally or alternatively, the computers and/or other programmable data processing equipment may provide steps for performing the functions described in the flowchart blocks.

Additionally or alternatively, flowchart blocks may represent but are not limited to modules, segments, and/or portions of code that include one or more executable instructions for executing specified logical function(s). It should also be noted that, in some alternative implementations, the functions recited in the blocks may occur out of order. For example, two blocks shown one after another may be performed substantially at the same time, and/or the blocks may sometimes be performed in the reverse order according to a corresponding function.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

A. Systems for Updating Machine Learning Models

Gradients corresponding to directions changes for model parameters configured in accordance with multiple embodiments of the invention are illustrated in FIG. 1. Gradients may be configured based on, but are not limited to, learning on source domains and unseen domains. In the present disclosure, "source domains" can refer to the data source(s) used for learning machine learning models, including but not limited to images. However, "unseen domains" can refer to data sources not used for learning the machine learning models. In some cases, unseen domains may indicate data sources for which models (learned using the source domains) are intended to perform a specific task. Additionally or alternatively, systems configured in accordance with many embodiments of inventions may include unseen domains that machine learning models cannot use while learning due to issues including but not limited to policy regulations and/or limitations in data collection. In accordance with many embodiments of the invention, source domains may include, but are not limited to data sources, that share similar characteristics to the data sources that make up unseen domains. Such characteristics may include but are not limited to the subject(s) of the data source(s).

For example, FIG. 1 illustrates an example of learning a model to perform a specific task for a dog, where the model is learned by using various dog images constituting the source domains. Here, the source domains may include, but are not limited to, paining image(s) of dog(s), cartoon image(s) of dog(s), and/or sketch image(s) of dog(s). In FIG. 1, the unseen domain includes a picture image of a dog. In such a case, the shared characteristic may be that both the source domain and the unseen domain include data sources where dogs are the subject.

Models configured in accordance with certain embodiments of the invention may learn through backpropagation using the data constituting the source domains and/or associated gradients. Gradients may represent indicators of the directions in which the models are updated (and/or that the parameter values of the models are updated) for models utilizing supervised learning. In accordance with various embodiments, values of model parameters may be determined and/or updated from an initial value (8), to imitate the distribution of the data constituting each source domain. In accordance with numerous embodiments of the invention, distributions of model parameters may take forms including but not limited to two-dimensional and/or three-dimensional spaces. The graph of FIG. 1 shows the distribution of model parameters in a two-dimensional space for convenience and visually shows the direction of changes in the parameter values of the model through gradients.

In accordance with several embodiments of the invention, model parameters may be updated independent of the unseen domains. For instance, based on the data distribution of FIG. 1, the model parameter values may be updated regardless of the data distribution of the unseen domain, such that the gradient of the model is also biased, without reflecting the unobserved gradient ($g_u$) of the unseen domain. In the present disclosure, this gradient may also be referred to as the "unobservable gradient" of the unseen domain.

The gradients (g) of models learned through the source domains may be biased in the distribution of data constituting the source domains ("biased gradients"). Although biased gradients can help reduce the empirical risk in the source domains by learning task-specific knowledge on the source domain, the biased gradient(s) may additionally or alternatively cause problems that increase the empirical risk in the unseen domains. In other words, the greater the difference between the data distribution of the source domain and the data distribution of the unseen domain, the higher the possibility that the performance of the model on the unseen domain is degraded (includes gradient conflicts).

Methods configured in accordance with numerous embodiments of the invention may address gradient conflicts through means including but not limited to estimating unobservable gradients through pre-trained models and reflecting the estimated unobservable gradients in model learning in order to increase capacity for domain generalization of the models.

Figure 2:
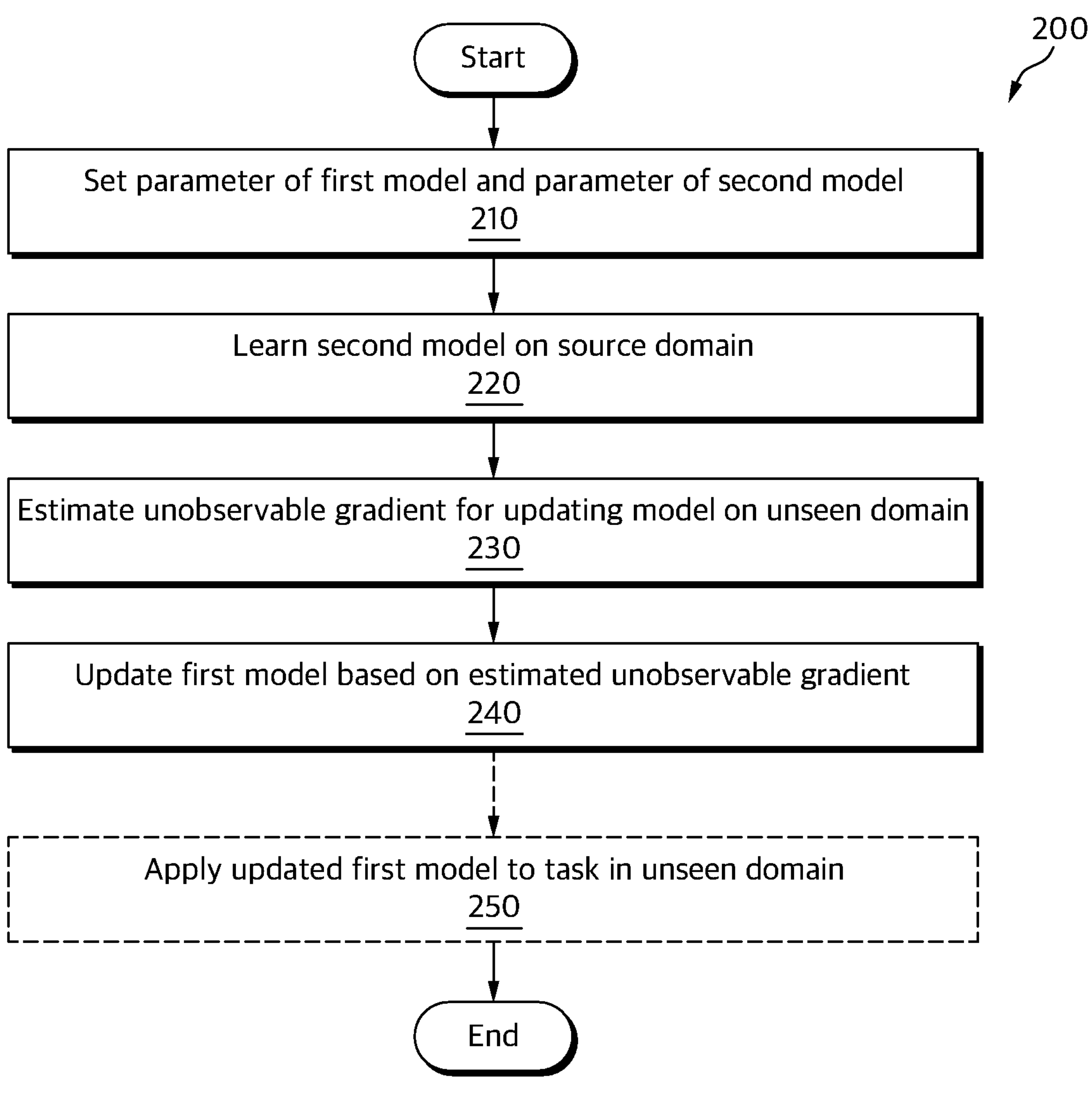
FIGS. 2-4 conceptually illustrate a method for domain generalization of a machine learning model configured in accordance with many embodiments of the invention.

A flowchart depicting a process for domain generalization of machine learning models, performed in accordance with many embodiments of the invention is illustrated in FIG. 2. A process, as described with respect to FIG. 2, may be performed by an apparatus for domain generalization, as described below in reference to FIG. 8. Additionally or alternatively, the method may be performed by another apparatus according to a number of embodiments of the invention.

Process 200 sets (210) a parameter of a first model and a parameter of a second model based on a pre-trained model. Process 200 may operate under the perception that, when pre-trained models are learned by using large datasets (for example, an image corpus), the pre-trained models may play the role of oracle models. In accordance with certain embodiments, pre-trained models may refer to models trained on a large scale using data having similar formats to the data used for training the first model and/or the second model. In accordance with various embodiments, the first model may perform a function of preserving the generalization power of the pre-trained model in order to improve the capability of the model for domain generalization. Additionally or alternatively, the second model may perform a function of learning task-specific knowledge and transferring the learned knowledge to the first model. Additionally or alternatively, each of the network structure(s) of the first model and the second model may include at least a part of a network structure of the pre-trained model.

Process 200 learns (220) the second model by performing a specific task on a source domain. Learning the second model may include but is not limited to updating the gradient and the parameter value of the second model by performing a specific task on the source domain through the second model. In accordance with some embodiments, process 200, when learning the second model through supervised learning, may calculate loss. Losses may be calculated by comparing each result value that is output by the second model receiving and outputting each data sample included in the source domain with each label corresponding to the input data sample. Additionally or alternatively, process 200 may update the gradient and/or the parameter of the second model in a direction in which the calculated loss decreases.

In accordance with some embodiments, in learning (220) the second model, process 200 may output a result value by using each data sample included in a mini-batch, selected from the source domain, as an input. Additionally or alternatively, process 200 may calculate a cross-entropy loss value of the second model by comparing the result value with each label corresponding to the data sample, and may update the gradient and the parameter of the second model in a direction in which the corresponding loss decreases. More specifically, process 200 may update the gradient and the parameter of the second model so that loss values calculated as a result of inputting data samples are minimized. However, the loss function(s) used for calculating the loss of the second model may not be necessarily limited to cross-entropy functions.

In accordance with numerous embodiments of the invention, the gradient of the second model may be expressed as an equation:

$$g = \nabla_\theta E_{(x,y)\sim B}[l((x, y); \theta)]. \quad (1)$$

Here, g represents a gradient of the second model; θ represents the (parameters of the) second model. (x,y) represents a data sample that is input to the second model; x represents an input that makes up the data sample; y represents the label corresponding to x; l represents loss; B represents a mini-batch; and E represents expectation for loss l.

Process 200 estimates (230) an unobservable gradient for updating the first model on an unseen domain. The unobservable gradient may be based on but is not limited to the parameter of the first model and the parameter of the second model. Unobservable gradients may reduce the bias of the gradient of the second model (i.e., biased gradient) generated by learning on the source domain. In order to calculate the unobservable gradient, systems configured in accordance with some embodiments of the inventions may need a parameter of an oracle model (e.g., the pre-trained model) with generalization power both on the unseen domain and in the source domain as shown in the equation:

$$g_u = \theta_u^* - \theta_{TE}. \quad (2)$$

Here, $g_u$ represents an unobservable gradient; $\theta_u$* represents a parameter of the oracle model; and $\theta_{TE}$ represents a parameter of the second model. However, since learning through the unseen domain is impossible, systems may be prevented from determining the parameter of the oracle model, and so the unobservable gradient cannot be observed.

Therefore, for domain generalization, systems configured in accordance with multiple embodiments of the invention may instead estimate the unobservable gradient. Process 200, in estimating (230) the unobservable gradient, may replace the parameter of the oracle model with a parameter of a first model having an observable gradient and thus process 200 may estimate a gradient indicating a direction between the parameter of the replaced (oracle) model and the parameter of the second model as the unobservable gradient. Specifically, process 200 may estimate an unobservable gradient with a vector that is calculated by subtracting, between parameters of corresponding types, the parameter of the second model from the parameter of the first model. When this is expressed as an equation, it is as follows.

$$\tilde{g}_u = \theta_{GE} - \theta_{TE}. \quad (3)$$

Here, $\tilde{g}_u$ represents an estimated unobservable gradient; $\theta_{GE}$ represents a parameter of the first model; and $\theta_{TE}$ represents a parameter of the second model. As such, replacing the parameter of the oracle model with the parameter of the first model may depend on the fact that the first model relatively preserves the generalization power of the pre-trained model. Assuming that the first model preserves the generalization power of the pre-trained model, the parameter(s) of the oracle model that cannot be estimated may thereby be replaced by those of the first model. This may be performed on the basis that the parameters of the first model are set based on the pre-trained model.

Process 200 updates (240) the first model based on the estimated unobservable gradient. In other words, through the first model learning, by using the unobservable gradient that reflects the learned task-specific knowledge without being biased, the first model may function as an advanced general-purpose model applicable to domains other than the source domain.

In accordance with a number of embodiments of the invention, the updated first model may be applied after being updated. In such cases, process 200 applies (250) the updated first model to a task on an unseen domain. In accordance with numerous embodiments of the invention, the task may be directed toward object detection. For example, the task performed by the first model on the unseen domain may be the same as or different from the specific task performed by the second model in (220). Specifically, process 200 may apply (250) the first model with the updated parameter to the object detection task even when the second model is learned by performing the classification task on the source domain.

In accordance with some embodiments, process 200 may continuously update the parameter of the first model by performing operations (220) to (240). These updates may be performed even as the first model, whose parameter has been updated, performs tasks on the unseen domain(s).

In accordance with multiple embodiments, process 200 may directly reflect task-specific knowledge (on the unseen domain) to the first model. This reflection may be performed by applying the first model with the updated parameter to the task(s) on the unseen domain(s), and in performing the task(s) on the unseen domain(s), additionally or alternatively, by using data input to the first model and/or the result calculated by the first model in response as new learning data samples. In accordance with various embodiments, to prevent the generalization power of the first model from being damaged, process 200 may adjust the effect of task-specific knowledge on the parameter(s) of the first model on the unseen domain(s) by using weight variables.

In accordance with several embodiments, the first model and/or the second model may include, but are not limited to, one or more feature extractors and/or task execution modules. Feature extractors may refer to a module that outputs a feature map from data that is input to the first model or the second model. For example, the feature extractor may include a convolutional neural network (CNN) structure. The task execution module is a module that performs tasks such as classification, object detection, and instance segmentation by using feature maps. For example, a module performing a classification task may include a layer that outputs a classification result value using classification algorithms such as k-nearest neighbor (KNN), decision tree, Naïve Bayes, and a support vector machine (SVM).

In accordance with some embodiments, when the first model and the second model each include a feature extractor and a task execution module, in process 200, parameters of feature extractors of each of the first model and the second model may be set to at least some of parameters of the pre-trained model, and process 200 may arbitrarily set parameters of each of the task performance modules of the first model and the second model. For example, in process 200, the parameter of the feature extractor of each of the first model and the second model may be initialized as a parameter of a feature extractor of the pre-trained model, and process 200 may arbitrarily set parameters of test execution modules of each of the first model and the second model within a preset range.

Figure 3:
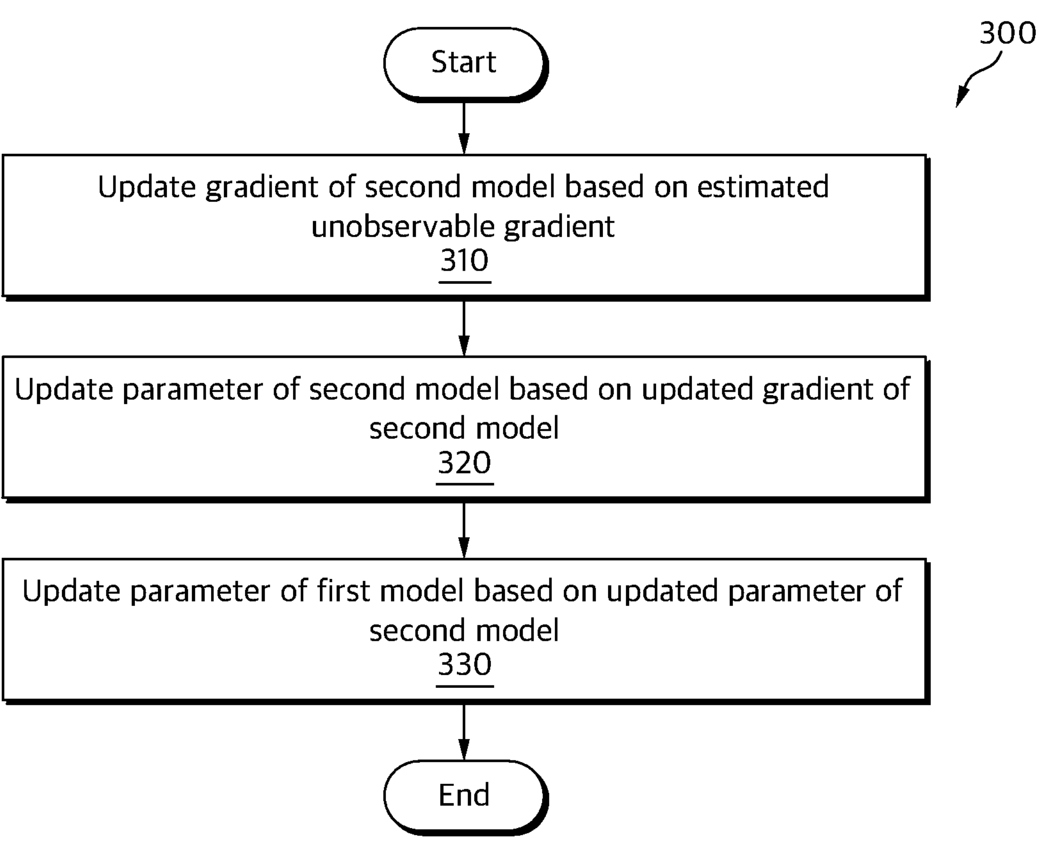

A process used in updating the first model, in accordance with certain embodiments of the invention, is illustrated with reference to FIG. 3. Process 300 may refer to, but is not limited to, the process described in operation (240) of FIG. 2. A process, as described with respect to FIG. 3, may be performed by an apparatus for domain generalization, as described below in reference to FIG. 8. Additionally or alternatively, the method may be performed by another apparatus according to numerous embodiments of the invention.

Process 300 updates (310) the gradient of the second model based on the estimated unobservable gradient. In doing so, process 300 preferentially reflects the influence of the estimated unobservable gradient on the second model. Process 300 updates (320) the parameter of the second model based on the updated gradient of the second model. Updating the gradient and parameter of the second model may enable process 300 to address the concern that the generalization power of the first model is damaged when task-specific knowledge is directly transferred to the first model. In other words, process 300 indirectly transfers task-specific knowledge to the first model, and by using the second model, the system has relatively no degradation in performance even on the unseen domain as a result, and the first model with improved domain generalization power may be constructed.

In accordance with various embodiments, process 300 may calculate a unit vector of a part corresponding to the feature extractor of the second model from the estimated unobservable gradient. Additionally or alternatively, process 300 may apply a preset gradient scale factor to the calculated unit vector and reflect the unit vector to the gradient of the feature extractor of the second model, in order to update the gradient of the second model. In accordance with some embodiments, the reflecting operation may be based on the following equation, but the gradient scale factor may be greater than 0 and not more than 0.5. As such, the reflection of the unit vector may follow the equation:

$$g^f = \frac{1}{2}\left(g^f + \lambda \|g^f\|_2 \cdot \frac{\tilde{g}_u^f}{\|\tilde{g}_u^f\|_2}\right). \tag{4}$$

Here, $g^f$ represents the gradient of the feature extractor of the second model;

$$\tilde{g}_u^f$$

represents the estimated unobservable gradient of the part corresponding to the feature extractor of the second model; and $\lambda$ represents the gradient scale factor. As shown in the equation, the gradient scale factor may act as a variable that adjusts the effect of the estimated unobservable gradient on updating the gradient of the second model.

Process 300 updates (330) the parameter of the first model based on the updated parameter of the second model. In doing so, process 300 transmits task-specific knowledge learned by the second model to the first model while relatively preserving the generalization power of the first model. However, in order to prevent the task-specific knowledge transmitted to the first model from damaging the generalization power of the first model, the effect of the task-specific knowledge on the parameter of the first model may be adjusted.

To this end, process 300 may adjust the ratio at which updated parameter value(s) of the second model are reflected on parameter value(s) of the first model by using related variables. As an example related to this, process 300 may update exponential moving averages between the existing parameter(s) of the first model and the updated parameter(s) of the second model as new parameter(s) of the first model. In accordance with many embodiments, updating (330) the parameter of the first model may be based on the following equation:

$$\theta_{GE} = m\theta_{GE} + (1-m)\theta_{TE}. \tag{5}$$

Here, $\theta_{GE}$ represents the parameter of the first model; $\theta_{TE}$ represents the parameter of the second model; and m represents the moving average coefficient. Systems in accordance with numerous embodiments may configure the moving average coefficient m such it is not less than 0.9 and not more than 1.0. Additionally or alternatively, a preferred value for m may be 0.99 or more. When m is 0.99, the parameter of the first model may be updated with the existing parameter of the first model and the updated parameter of the second model at a ratio of 99:1.

Figure 4:
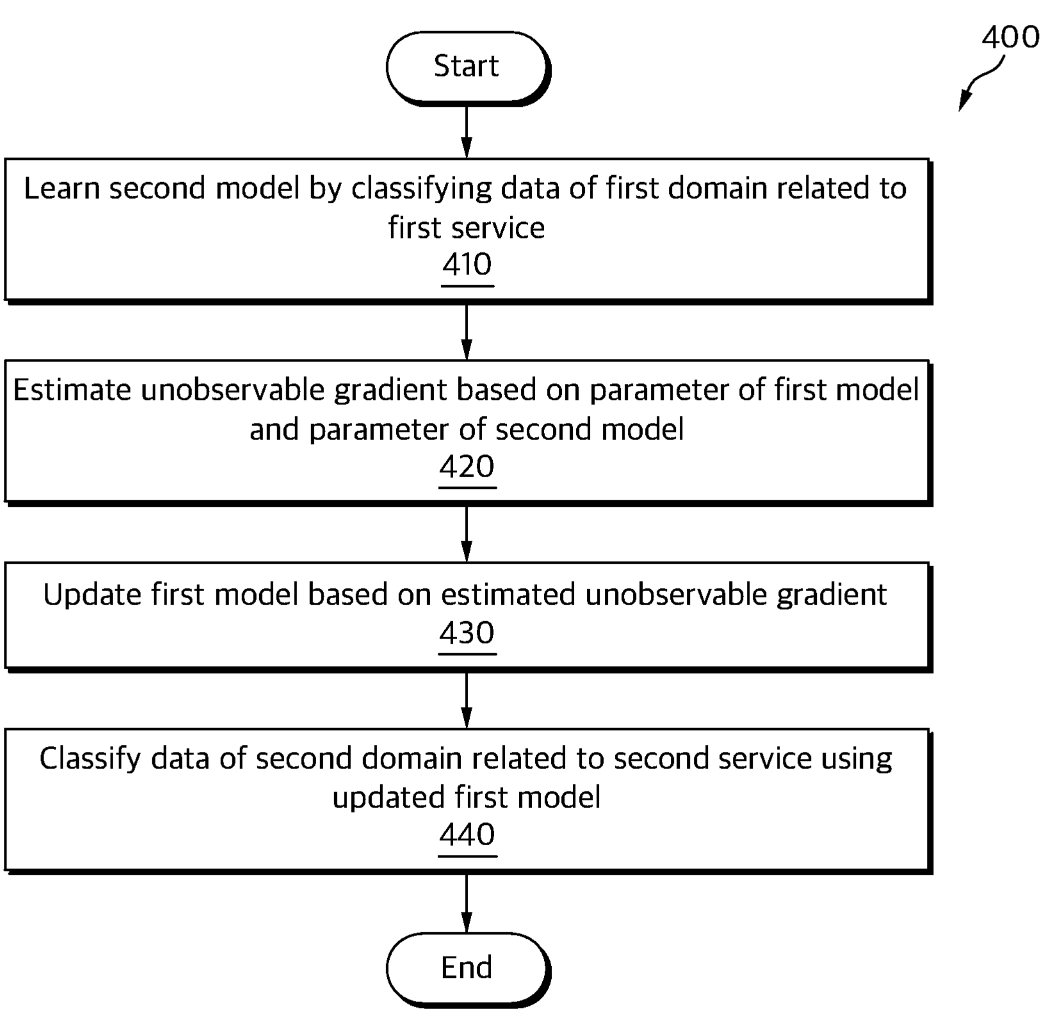

A process used in applying, to a service, domain generalization performed in accordance with miscellaneous embodiments of the invention, is illustrated in FIG. 4. Process 400 may refer to, but is not limited to, the process described in operation (250) of FIG. 2.

In the first model and the second model based on the pre-trained model, process 400 learns (410) the second model by classifying data of a first domain related to a first service. Process 400 estimates (420) an unobservable gradient based on the parameter of the first model and the parameters of the second model. Process 400 updates (430) the first model based on the estimated unobservable gradient. Process 400 classifies (440) data of a second domain related to a second service by using the updated first model.

While specific processes governing updates of machine learning models are described above, any of a variety of processes can be utilized for domain generalization as appropriate to the requirements of specific applications. In many embodiments, steps may be executed or performed in any order or sequence not limited to the order and sequence shown and described. In numerous embodiments, some of the above steps may be executed or performed substantially simultaneously where appropriate or in parallel to reduce latency and processing times. In several embodiments, one or more of the above steps may be omitted.

B. Systems for Domain Generalization of Machine Learning Models

Figure 5:
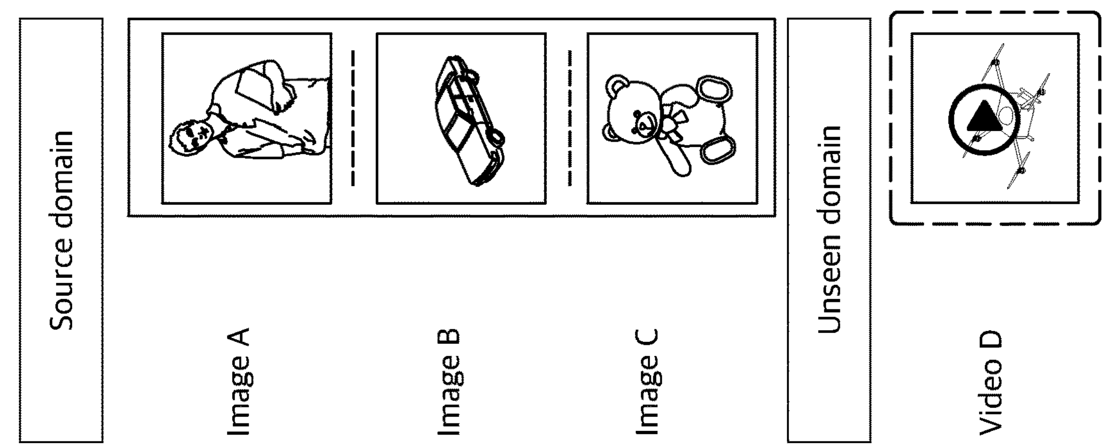

Examples of domain generalization performed in accordance with numerous embodiments of the invention are illustrated in FIGS. 5-6. As illustrated in FIG. 5, source domains may include a plurality of labeled image data (e.g., image A, image B, and image C), and unseen domains may include labeled video data (e.g., video D). As described above, the machine learning model may (additionally or alternatively) learn by using the source domains exclusively. For example, in the above example, machine learning models may learn by crawling data on SNS platforms where images, not videos, are posted. In this case, since the machine learning model is not learned by using video data, it may be difficult to guarantee performance on the unseen domain.

Systems and methods for domain generalization may estimate the gradient(s) calculated by difference(s) between the parameter of the first model and the parameter of the second model (as an unobservable gradient); update the gradient of the second model by using the estimated unobservable gradient; update the parameter of the second model by using the updated gradient of the second model; and/or update the parameter of the first model by using the updated parameter of the second model. By doing this, the first model may operate with good performance even on the unseen domain. In the example used in FIG. 5, this may allow the underlying model to operate even on domains including video data, despite learning based on images, while preserving generalization power.

As illustrated in FIG. 6, source domains may additionally or alternatively, include content data (e.g., open content A, open content B, and open content C) access to which is not restricted on a website, while the unseen domain may include harmful content data (e.g., harmful content D) corresponding to a predetermined harmful criterion. As described in FIG. 5, the machine learning model(s) may learn by using the source domains exclusively. For example, in FIG. 6, a system configured in accordance with a few embodiments of the invention may determine that only images in articles uploaded to the website may be used for the machine learning model(s). Additionally or alternatively, the system may determine that content with high levels of violence and/or obscenity may not be used for the machine learning model(s) due to compliance with laws.

In the case depicted in FIG. 6, because the machine learning model(s) did not learn by using harmful content data, systems configured in accordance with some embodiments may have trouble ensuring performance on the unseen domain. As disclosed above, systems and methods for domain generalization may estimate the gradient(s) calculated by difference(s) between the parameter of the first model and the parameter of the second model (as an unobservable gradient); update the gradient of the second model by using the estimated unobservable gradient; update the parameter of the second model by using the updated gradient of the second model; and/or update the parameter of the first model by using the updated parameter of the second model. In the example used in FIG. 6, this may allow the underlying model(s) to operate even on domains including harmful content, while preserving generalization power. Prospective harmful content may include but is not limited to content that is offensive, inappropriate, triggering, and/or disgusting. Some examples include an image in which a specific part of a person or an animal is exposed, an image of human or animal feces, an image of an injured part, an image of an accident scene, and an image that may cause dizziness or seizures.

Figure 7:
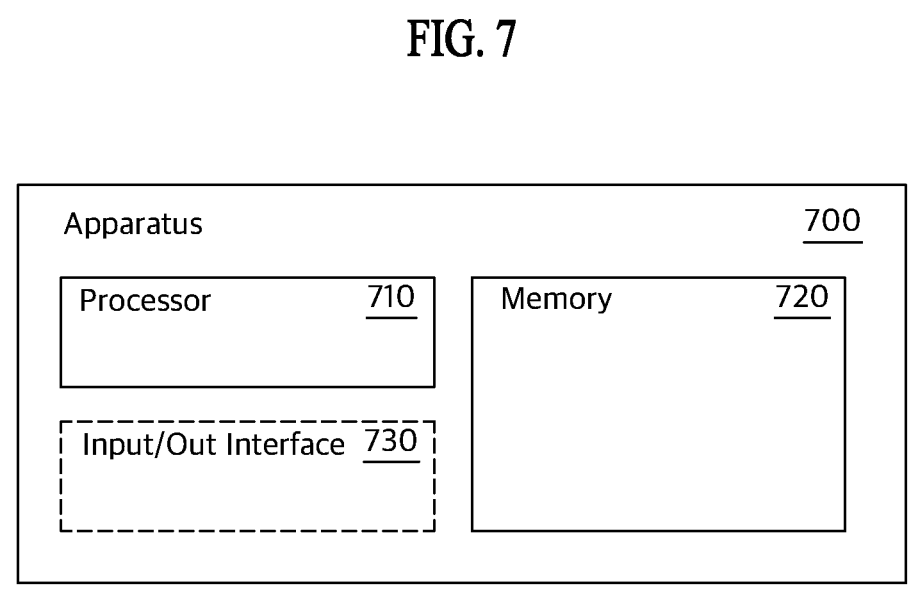

A flowchart depicting an apparatus, configured in accordance with various embodiments of the invention, for domain generalization of a machine learning model is illustrated in FIG. 7. The electronic apparatus 700 illustrated in FIG. 7 may include, but is not limited to a memory 720 and a processor 710.

In accordance with some embodiments, the electronic apparatus 700 may further include an input/output interface 730. Using the input/output interface 730, the electronic apparatus 700 may exchange data between internal modules. Additionally or alternatively, the electronic apparatus 700 may exchange data by being connected to an external apparatus.

In accordance with several embodiments the processor 710 may perform at least one method described above with respect to FIGS. 1 to 6. Additionally or alternatively, the memory 720 may store information for performing at least one method described above with respect to FIGS. 1 to 6. The processor 710 may control the electronic apparatus 700 to execute a program and provide information.

Program codes executed by the processor 710 may be stored in the memory 720. In accordance with numerous embodiments, the memory 720 may be a volatile memory and/or a non-volatile memory. Additionally or alternatively, the processor 710 of the electronic apparatus 700 may be connected to the memory 720. Instructions stored in the memory 720 may allow the processor 710 to perform actions including but not limited to setting a parameter of the first model and a parameter of the second model based on a pre-trained model, learning the second model by performing a specific task on a source domain, estimating an unobservable gradient for model updates on an unseen domain based on the parameter of the first model and the parameter of the second model, updating the gradient of the second model based on the estimated unobservable gradient, updating the parameter of the second model based on the updated gradient of the second model, and/or updating the parameter of the first model based on the updated parameter of the second model.

In the electronic apparatus 700 shown in FIG. 7, only elements related to the present example embodiments are shown. Therefore, those skilled in the art related to the present example embodiments may understand that other general-purpose elements may be further included in addition to the elements illustrated in FIG. 7.

In the electronic apparatus 700 shown in FIG. 7, only elements related to the present example embodiments are shown. Therefore, those skilled in the art related to the present example embodiments may understand that other general-purpose elements may be further included in addition to the elements illustrated in FIG. 7.

As indicated above, apparatuses operating in accordance with several of the above-described embodiments may include, but are not limited to, one or more processors; memory that can store and executes program data; permanent storage including but not limited to disk drives; communication port(s) for communication with external devices; and user interface device(s) including but not limited to touch panels, keys, and buttons. Methods realized by software modules and/or algorithms may be stored in computer-readable recording medium(s) as computer-readable codes and/or program commands which may be executed by processors. Here, the computer-readable recording mediums may include but are not limited to magnetic storage mediums (for example, read-only memory (ROM), random-access memory (RAM), floppy disks, and/or hard disks). Additionally or alternatively, the computer-readable recording mediums may include optical reading mediums (for example, compact disc read-only memory (CD-ROMs) and/or digital versatile discs (DVDs)). The computer-readable recording mediums may be dispersed to computer systems connected by networks so that computer-readable codes can be stored and executed in a dispersion manner. The medium(s) may be read by computers, may be stored in memory, and/or may be executed by processors.

Systems in accordance with many embodiments of the invention may be represented by functional blocks and various processing steps. These functional blocks may be implemented by various numbers of hardware and/or software configurations that execute specific functions. For example, the present embodiments may adopt direct circuit configurations including but not limited to memory, processors, logic circuits, and look-up tables that may execute various functions by control of one and/or more microprocessors and/or other control devices. Similarly to that elements may be executed by software programming and/or software elements, the present embodiments may be implemented by programming and/or scripting languages including but not limited to C, C++, Java, and assembler including various algorithms implemented by combinations of data structures, processes, routines, and/or of other programming configurations. Functional aspects may be implemented by algorithms executed by one and/or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include the meaning of a series of routines of software in association with a processor, for example.

Systems and techniques directed towards updating models and/or domain generalization, in accordance with certain embodiments of the invention, are not limited to use in the context of machine learning. Moreover, any of the systems and methods described herein with reference to FIGS. 1-7 can be utilized within any of the system configurations described above.

C. System Implementations

Table 1 below illustrates the performance (generalization power) of the disclosed method for domain generalization and other methods using five representative benchmark datasets (PACS (Li et al., 2017), VLCS (Fang et al., 2013), OfficeHome (Venkateswara et al., 2017), TerraInc (Beery et al., 2018), and DomainNet (Peng et al., 2019)) that measure the capability of domain generalization. ResNet-50 (He et al., 2016), CLIP (Radford et al., 2021), and SWAG (Singh et al., 2022) with different sizes were used as pre-trained models, which are basic models with generalization power. In the experiment, the gradient scale factor searched for the optimal value among 0.01, 0.05, 0.1, and 0.5, and the moving average coefficient was fixed at 0.999.

TABLE 1

| Method | PACS | VLCS | OfficeHome | TerraInc | DomainNet | Avg. |
|---|---|---|---|---|---|---|
| Using ResNet-50 pre-trained on ImageNet. | | | | | | |
| ERM | 84.2 ± 0.1 | 77.3 ± 0.1 | 67.6 ± 0.2 | 47.8 ± 0.6 | 44.0 ± 0.1 | 64.2 |
| SagNet | 86.3 ± 0.2 | 77.8 ± 0.5 | 68.1 ± 0.1 | 48.6 ± 1.0 | 40.3 ± 0.1 | 64.2 |
| SelfReg | 85.6 ± 0.4 | 77.8 ± 0.9 | 67.9 ± 0.7 | 47.0 ± 0.3 | 42.8 ± 0.0 | 64.2 |
| CORAL | 86.2 ± 0.3 | 78.8 ± 0.6 | 68.7 ± 0.3 | 47.6 ± 1.0 | 41.5 ± 0.1 | 64.5 |
| mDSDI | 86.2 ± 0.2 | 79.0 ± 0.3 | 69.2 ± 0.4 | 48.1 ± 1.4 | 42.8 ± 0.1 | 65.1 |
| GVRT | 85.1 ± 0.3 | 79.0 ± 0.2 | 70.1 ± 0.1 | 48.0 ± 1.4 | 44.1 ± 0.1 | 65.2 |
| MIRO | 85.4 ± 0.4 | 79.0 ± 0.0 | 70.5 ± 0.4 | 50.4 ± 1.1 | 44.3 ± 0.2 | 65.9 |
| SWAD | 88.1 ± 0.1 | 79.1 ± 0.1 | 70.6 ± 0.2 | 50.0 ± 0.3 | 46.5 ± 0.1 | 66.9 |
| GESTUR | 88.2 ± 0.4 | 80.1 ± 0.2 | 71.0 ± 0.0 | 52.0 ± 0.0 | 46.3 ± 0.0 | 67.5 |
| Using ViT-B/16 with CLIP. | | | | | | |
| ERM | 83.4 ± 0.5 | 75.9 ± 1.3 | 66.4 ± 0.5 | 35.3 ± 0.8 | 44.4 ± 0.6 | 61.1 |
| SWAD | 91.3 ± 0.1 | 79.4 ± 0.4 | 76.9 ± 0.1 | 45.4 ± 0.5 | 51.7 ± 0.8 | 68.9 |
| MIRO | 95.6 ± 0.8 | 82.2 ± 0.3 | 82.5 ± 0.1 | 54.3 ± 0.4 | 54.0 ± 0.3 | 73.7 |
| GESTUR | 96.2 ± 0.1 | 82.8 ± 0.1 | 84.7 ± 0.0 | 55.7 ± 0.2 | 59.8 ± 0.2 | 75.8 |
| Using RegNetY-16GF with SWAG. | | | | | | |
| ERM | 89.6 ± 0.4 | 78.6 ± 0.3 | 71.9 ± 0.6 | 51.4 ± 1.8 | 48.5 ± 0.6 | 68.0 |
| SWAD | 94.7 ± 0.2 | 79.7 ± 0.2 | 80.0 ± 0.1 | 57.9 ± 0.7 | 53.6 ± 0.6 | 73.2 |
| MIRO | 97.4 ± 0.2 | 79.9 ± 0.6 | 80.4 ± 0.2 | 58.9 ± 1.3 | 53.8 ± 0.1 | 74.1 |
| GESTUR | 97.9 ± 0.1 | 83.5 ± 0.1 | 83.5 ± 0.0 | 62.1 ± 0.3 | 60.1 ± 0.0 | 77.4 |

Models built according to disclosed methods (i.e., GESTUR) show the best evaluation results compared to other methods (empirical risk minimization (ERM) (Vapnik, 1999), SagNet (Nam et al., 2021), SelfReg (Kim et al., 2021), CORAL (Sun & Saenko, 2016), mDSDI (Bui et al., 2021), GVRT (Min et al., 2022), MIRO (Cha et al., 2022), and SWAD (Cha et al., 2021)) when using the same benchmark dataset, and the same pre-trained models, and the average evaluation score is also the highest at 67.5. Specifically, since the disclosed method shows the best evaluation results in all experiments using ResNet-50, CLIP, and SWAG having different sizes, it is verified that the model, GESTUR, built according to the disclosed method may be commonly used based on various pre-trained models.

Table 2 below shows a comparison of generalization powers of a first model (a generalization expert, GE) and a second model (a task expert, TE) that are built according to an existing method (ERM) and the disclosed method by using four representative benchmark datasets (PACS, VLCS, OfficeHome, and TerraInc), and ResNet-50, CLIP, and SWAG with different sizes as pre-trained models.

TABLE 2

| Method | PACS | VLCS | OfficeHome | TerraInc | Avg. |
|---|---|---|---|---|---|
| Using ResNet-50 pre-trained on ImageNet. | | | | | |
| ERM | 84.2 ± 0.1 | 77.3 ± 0.1 | 67.6 ± 0.2 | 47.8 ± 0.6 | 69.2 |
| GESTUR w/TE | 85.6 ± 0.1 | 79.2 ± 0.5 | 66.6 ± 0.2 | 47.5 ± 1.7 | 69.7 |
| GESTUR w/GE | 88.2 ± 0.4 | 80.1 ± 0.2 | 71.0 ± 0.0 | 52.0 ± 0.0 | 72.8 |
| Using ViT-B/16 with CLIP. | | | | | |
| ERM | 83.4 ± 0.5 | 75.9 ± 1.3 | 66.4 ± 0.5 | 35.3 ± 0.8 | 65.3 |
| GESTUR w/TE | 93.9 ± 0.9 | 82.4 ± 0.4 | 83.6 ± 0.1 | 50.4 ± 0.2 | 77.6 |
| GESTUR w/GE | 96.2 ± 0.1 | 82.8 ± 0.1 | 84.7 ± 0.0 | 55.7 ± 0.2 | 79.9 |
| Using RegNetY-16GF with SWAG. | | | | | |
| ERM | 89.6 ± 0.4 | 78.6 ± 0.3 | 71.9 ± 0.6 | 51.4 ± 1.8 | 72.9 |
| GESTUR w/TE | 97.5 ± 0.2 | 82.5 ± 0.4 | 77.1 ± 0.3 | 57.0 ± 0.9 | 78.5 |
| GESTUR w/GE | 97.9 ± 0.1 | 83.5 ± 0.1 | 83.5 ± 0.0 | 62.1 ± 0.3 | 81.8 |

In all cases, including a combination of the benchmark dataset and the pre-trained model, the first model built according to the presently disclosed method shows the best evaluation results, and the average evaluation scores are also the highest. This is due to the fact that the first model has a feature of preserving generalization power more than the second model. In addition, even the second model shows higher performance in most cases compared to the existing method.

Table 3 below shows the proportion of gradient conflicts between biased gradient g and unobservable gradient $g_u$ in the entire iteration learning process by using four representative benchmark datasets (PACS, VLCS, OfficeHome, and TerraInc), and ResNet-50, CLIP, and SWAG with different sizes as pre-trained models.

TABLE 3

| Method | PACS | VLCS | OH | TI | Avg. |
|---|---|---|---|---|---|
| Using ResNet-50 pre-trained on ImageNet. | | | | | |
| ERM | 28.6 | 37.3 | 20.3 | 35.4 | 30.4 |
| GESTUR | 26.2 | 29.8 | 21.0 | 30.9 | 27.0 |
| Using ViT-B/16 with CLIP | | | | | |
| ERM | 35.3 | 43.1 | 33.4 | 42.6 | 38.6 |
| GESTUR | 27.1 | 37.4 | 33.0 | 30.8 | 32.1 |
| Using RegNetY-16GF with SWAG. | | | | | |
| ERM | 31.7 | 39.7 | 30.0 | 37.5 | 34.7 |
| GESTUR | 25.9 | 34.8 | 20.2 | 23.9 | 26.2 |

How much gradient conflicts occurred during fine-tuning through learning is analyzed, and how much the bias of the gradient was relieved through the model, GESTUR, built according to the disclosed method is analyzed. The gradient conflicts are defined as the existence of gradient conflicts between $g_i$ and $g_j$ when the dot product of the two gradients $g_i$ and $g_j$ is negative. The experimental process is as follows. First, in each of the source domain and the unseen domain, a mini-batch is sampled at each iteration. Second, by calculating the loss values of the mini-batches, the gradient g and the unobservable gradient $g_u$ of the model (ERM and/or GESTUR) are calculated from each loss value. Third, the ratio of gradient conflicts is calculated by counting the number of iterations in which gradient conflicts occur between gradient g and unobservable gradient $g_u$ of the model (ERM and/or GESTUR). Here, the model is updated by using only the gradient g computed in mini-batches sampled from the source domain, and this is because the unseen domain is not accessible in reality.

As a result, as shown in Table 3, in the case of ERM, gradient conflict occurred at rates of 30.4%, 38.6% and 34.7% of the total iteration process for ResNet-50, CLIP, and SWAG, respectively. On the other hand, GESTUR reduced gradient conflicts by about 11%, 17% and 25%, respectively, compared to ERM. Thus the disclosed method verifies the relieving gradient bias by estimating the unobservable gradient through the pre-trained models.

Table 4 below shows the linear probing performance of the frozen pre-trained model $\theta_0$ and the feature extractor $$\theta^f_{GE}$$

of the first model using four representative benchmark datasets (PACS, VLCS, OfficeHome, and TerraInc), and CLIP and SWAG as pre-trained models. Linear search is a common method for evaluating the representational quality of a model. In an experiment below, it is assumed that as the feature extractor learns more task-specific knowledge, the linear probing performance on an unseen domain for the task improves.

TABLE 4

| Model | PACS | VLCS | OfficeHome | TerraInc | Avg. |
|---|---|---|---|---|---|
| Using ViT-B/16 with CLIP. | | | | | |
| frozen | 98.5 ± 0.1 | 88.5 ± 0.2 | 89.3 ± 0.1 | 83.4 ± 0.2 | 89.9 |
| GE | 98.6 ± 0.0 | 90.0 ± 0.6 | 90.2 ± 0.1 | 88.3 ± 0.1 | 91.8 |
| Using RegNetY-16GF with SWAG. | | | | | |
| frozen | 98.9 ± 0.1 | 87.1 ± 0.2 | 89.6 ± 0.0 | 89.3 ± 0.0 | 91.2 |
| GE | 98.9 ± 0.1 | 88.8 ± 0.2 | 90.9 ± 0.1 | 90.7 ± 0.0 | 92.3 |

Specifically, the feature extractor of the first model is learned, and then the linear probing performance on the unseen domain is evaluated through the learned feature extractor. Then, the case is compared with the case where a frozen-trained model is used as a feature extractor. It should be noted that CLIP and SWAG used in the analysis are pre-trained with a goal clearly different from that of the task in order to prove the efficiency of newly learned task-specific knowledge.

As a result, as shown in Table 4, the first model shows superior performance in all benchmark datasets except for one case in which the performance of the two models are evaluated identically compared to the frozen pre-trained model. This shows that the first model is closer to the oracle model by further learning task-specific knowledge.

Tables 5 to 8 below show the relationship between the scale and gradient scale factor of the pre-trained models and the generalization power (performance) of the built model. The performance of the model is measured on the PACS benchmark dataset, and the left side of the table shows the dataset used for learning the pre-trained models, the pre-learning method and the architecture of the model. The right side of the table shows the performance of the model when the values of the gradient scale factor, which is the ratio of reflecting the estimated unobservable gradient to the gradient of the second model, are set to 0.01, 0.05, 0.1, and 0.5, respectively.

TABLE 5

| Dataset (size) | Pre-training | Architecture | λ 0.01 | λ 0.05 | λ 0.1 | λ 0.5 |
|---|---|---|---|---|---|---|
| ImageNet (1.3M) | ERM | ResNet-50 | 88.2 ± 0.4 | 86.2 ± 0.0 | 82.7 ± 0.2 | 72.7 ± 0.2 |
| CLIP (400M) | CLIP | ViT-B/16 | 94.8 ± 0.2 | 96.0 ± 0.0 | 96.2 ± 0.1 | 96.0 ± 0.0 |
| Instagram (3.6 B) | SWAG | RegNetY-16GF | 96.3 ± 0.2 | 96.9 ± 0.1 | 97.6 ± 0.1 | 97.9 ± 0.1 |

TABLE 6

| Dataset (size) | Pre-training | Architecture | λ 0.01 | λ 0.05 | λ 0.1 | λ 0.5 |
|---|---|---|---|---|---|---|
| ImageNet (1.3M) | ERM | ResNet-50 | 78.9 ± 0.3 | 80.1 ± 0.2 | 80.0 ± 0.1 | 77.6 ± 0.1 |
| CLIP (400M) | CLIP | ViT-B/16 | 81.3 ± 0.4 | 82.7 ± 0.1 | 82.8 ± 0.1 | 82.1 ± 0.3 |
| Instagram (3.6 B) | SWAG | RegNetY-16GF | 81.7 ± 0.0 | 82.7 ± 0.2 | 83.5 ± 0.1 | 82.4 ± 0.2 |

TABLE 7

| Dataset (size) | Pre-training | Architecture | λ 0.01 | λ 0.05 | λ 0.1 | λ 0.5 |
|---|---|---|---|---|---|---|
| ImageNet (1.3M) | ERM | ResNet-50 | 71.0 ± 0.0 | 70.9 ± 0.1 | 70.4 ± 0.2 | 69.3 ± 0.1 |
| CLIP (400M) | CLIP | ViT-B/16 | 82.5 ± 0.2 | 84.2 ± 0.1 | 84.4 ± 0.0 | 84.7 ± 0.0 |
| Instagram (3.6 B) | SWAG | RegNetY-16GF | 81.5 ± 0.2 | 83.1 ± 0.0 | 83.5 ± 0.0 | 81.1 ± 0.1 |

TABLE 8

| Dataset (size) | Pre-training | Architecture | λ 0.01 | λ 0.05 | λ 0.1 | λ 0.5 |
|---|---|---|---|---|---|---|
| ImageNet (1.3M) | ERM | ResNet-50 | 52.0 ± 0.0 | 50.4 ± 0.6 | 46.1 ± 0.3 | 31.1 ± 0.1 |
| CLIP (400M) | CLIP | ViT-B/16 | 51.3 ± 0.2 | 55.7 ± 0.2 | 54.0 ± 0.3 | 42.3 ± 0.9 |
| Instagram (3.6 B) | SWAG | RegNetY-16GF | 57.6 ± 0.9 | 61.1 ± 0.4 | 62.1 ± 0.3 | 54.9 ± 0.1 |

Referring to Table 5, when ResNet-50 is used as a pre-trained model, optimal performance is achieved at a gradient scale factor value of 0.01, but when using a larger scale CLIP and SWAG as a pre-trained model, optimal performance is achieved at gradient scale factor values of 0.1, and 0.5, respectively. As shown in Table 6 to Table 8, similar patterns are shown when using other benchmark datasets (VLCS, OfficeHome, and TerraInc). Referring to the performance index in each table, it may be seen that the larger the size of the pre-trained model, the closer it is to the oracle model and it helps to accurately estimate the unobservable gradient. In addition, when using a larger-scale pre-trained model, it may be seen that the domain generalization power improves as the gradient scale factor increases.

Although specific methods of domain generalization are discussed above, many different methods of domain generalization can be implemented in accordance with many different embodiments of the invention. It is, therefore, to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for domain generalization of a machine learning model, comprising:

setting a parameter of a first model and a parameter of a second model based on a pre-trained model;

learning the second model by performing a predetermined task on a source domain;

estimating an unobservable gradient for model updates on an unseen domain based on the parameter of the first model; and the parameter of the second model, wherein estimating the unobservable gradient includes estimating a vector by subtracting, for parameters of corresponding types, the parameter of the second model from the parameter of the first model; and updating the first model based on the estimated unobservable gradient.

2. The method of claim 1, wherein:

both the first model and the second model comprise:

a feature extractor; and a task execution module;

setting parameters of a model comprises setting parameters of a feature extractor of the model to at least one parameter of the pre-trained model; and the task execution module of the first model and the task execution module of the second model each have parameters that are arbitrarily set.

3. The method of claim 1, wherein learning the second model comprises:

retrieving at least one result value, wherein:

the at least one result value is output by the second model after receiving at least one data sample included in the source domain; and each result value of the at least one result value corresponds to a data sample of the at least one data sample;

for each result value of the at least one result value, modifying a total loss by comparing the result value to a label for the corresponding data sample; and updating a gradient and the parameter of the second model in a direction associated with a decrease in the total modified loss.

4. The method of claim 3, wherein modifying the total loss comprises calculating a cross-entropy loss value of the second model by using each data sample included in a mini-batch selected from the source domain.

5. The method of claim 1, wherein updating the first model comprises:

determining a gradient of the second model based on the estimated unobservable gradient;

updating the parameter of the second model based on the gradient of the second model; and updating the parameter of the first model based on the updated parameter of the second model.

6. The method of claim 5, wherein:

the second model comprises a feature extractor; and determining the gradient of the second model comprises:

calculating a unit vector of a part from the estimated unobservable gradient, wherein the part corresponds to the feature extractor of the second model;

applying a predetermined gradient scale factor to the unit vector; and reflecting the unit vector at a gradient of the feature extractor of the second model.

7. The method of claim 6, wherein reflecting the unit vector is based, at least in part on the equation:

$$g^f = \frac{1}{2}\left(g^f + \lambda\|g^f\|_2 \cdot \frac{\tilde{g}_u^f}{\|\tilde{g}_u^f\|_2}\right),$$

wherein:

$g^f$ represents the gradient of the feature extractor of the second model;

$$\tilde{g}_u^f$$

represents an estimated unobservable gradient of a part corresponding to the feature extractor of the second model;

$\lambda$ represents the predetermined gradient scale factor; and the predetermined gradient scale factor is greater than 0 and not more than 0.5.

8. The method of claim 5, wherein updating the parameter of the first model comprises updating an exponential moving average as a new parameter of the first model, wherein the exponential moving average is between the parameter of the first model and the updated parameter of the second model.

9. The method of claim 8, wherein updating the parameter of the first model is based, at least in part, on the equation:

$\theta_{GE}=M\theta_{GE}+(1-m)\theta_{TE}$, wherein:

$\theta_{GE}$ represents the parameter of the first model;

$\theta_{TE}$ represents the parameter of the second model;

m represents a moving average coefficient; and the moving average coefficient is not less than 0.9 and not more than 1.0.

10. The method of claim 1, further comprising applying the updated first model to a task on the unseen domain.

11. The method of claim 1, wherein:

the source domain comprises a plurality of labeled image data;

the unseen domain comprises a plurality of labeled video data; and the predetermined task is a classification task through a machine learning model.

12. The method of claim 1, wherein:

the source domain comprises content data;

access of the content data is not restricted; and the unseen domain comprises harmful content data corresponding to a predetermined harmfulness criterion.

13. A non-transitory computer-readable medium including instructions that, when executed by a processor, perform a process for domain generalization of a machine learning model, wherein the process comprises:

setting a parameter of a first model and a parameter of a second model based on a pre-trained model;

learning the second model by performing a predetermined task on a source domain;

estimating an unobservable gradient for model updates on an unseen domain based on the parameter of the first model; and the parameter of the second model, wherein estimating the unobservable gradient includes estimating a vector by subtracting, for parameters of corresponding types, the parameter of the second model from the parameter of the first model; and updating the first model based on the estimated unobservable gradient.

14. The non-transitory computer-readable medium of claim 13, wherein:

both the first model and the second model comprise:

a feature extractor; and a task execution module;

setting parameters of a model comprises setting parameters of a feature extractor of the model to at least one parameter of the pre-trained model; and the task execution module of the first model and the task execution module of the second model each have parameters that are arbitrarily set.

15. The non-transitory computer-readable medium of claim 13, wherein learning the second model comprises:

retrieving at least one result value, wherein:

the at least one result value is output by the second model after receiving at least one data sample included in the source domain; and each result value of the at least one result value corresponds to a data sample of the at least one data sample;

for each result value of the at least one result value, modifying a total loss by comparing the result value to a label for the corresponding data sample; and updating a gradient and the parameter of the second model in a direction associated with a decrease in the total modified loss.

16. An apparatus for domain generalization of a machine learning model, comprising:

a processor;

memory accessible by the processor; and instructions stored in the memory that, when read by the processor, direct the processor to set a parameter of a first model and a parameter of a second model based on a pre-trained model;

learn the second model by performing a predetermined task on a source domain;

estimate an unobservable gradient for model updates on an unseen domain based on the parameter of the first model and the parameter of the second model, wherein estimating the unobservable gradient includes estimating a vector by subtracting, for parameters of corresponding types, the parameter of the second model from the parameter of the first model; and update the first model based on the estimated unobservable gradient.

17. The apparatus of claim 16, wherein:

both the first model and the second model comprise:

a feature extractor; and a task execution module;

setting parameters of a model comprises setting parameters of a feature extractor of the model to at least one parameter of the pre-trained model; and the task execution module of the first model and the task execution module of the second model each have parameters that are arbitrarily set.

18. An apparatus for domain generalization using a first model and a second model based on a pre-trained model, the apparatus comprising:

a processor;

memory accessible by the processor; and instructions stored in the memory that, when read by the processor, direct the processor to retrieve a first model and a second model;

learn the second model by classifying data of a first domain related to a first service;

estimate an unobservable gradient based on a parameter of the first model and a parameter of the second model, wherein estimating the unobservable gradient includes estimating a vector by subtracting, for parameters of corresponding types, the parameter of the second model from the parameter of the first model;

update the first model based on the estimated unobservable gradient; and classify data of a second domain related to a second service by using the updated first model.

19. A method for domain generalization of a machine learning model, comprising:

retrieving a first model and a second model;

learning the second model by classifying data of a first domain related to a first service;

estimating an unobservable gradient based on a parameter of the first model; and a parameter of the second model, wherein estimating the unobservable gradient includes estimating a vector by subtracting, for parameters of corresponding types, the parameter of the second model from the parameter of the first model;

updating the first model based on the estimated unobservable gradient; and classifying data of a second domain related to a second service by using the updated first model.

* * * * *